US011415169B2

(12) United States Patent
De Raeve et al.

(10) Patent No.: US 11,415,169 B2
(45) Date of Patent: Aug. 16, 2022

(54) MULTIPHASE PUMP (71) Applicant: Sulzer Management AG, Winterthur (CH)

(72) Inventors: Karel De Raeve, Winterthur (CH); Marco Carvalho, Kyburg (CH); Thomas Welschinger, Radolfzell (DE)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 17/032,241

(22) Filed: Sep. 25, 2020

(65) Prior Publication Data

US 2021/0123476 A1 Apr. 29, 2021

(30) Foreign Application Priority Data

Oct. 25, 2019 (EP) .................................. 19205456.7

(51) Int. Cl.
*F16C 17/03* (2006.01)
*F16C 27/02* (2006.01)
(Continued)

(52) U.S. Cl.
CPC ............ *F16C 17/03* (2013.01); *F04D 13/086* (2013.01); *F04D 29/668* (2013.01); *F16C 27/02* (2013.01);
(Continued)

(58) Field of Classification Search
CPC ...... F16C 17/03; F16C 27/02; F16C 2360/00; F16C 2360/44; F16F 15/0237; F04D 3/00;
(Continued)

(56) References Cited

U.S. PATENT DOCUMENTS 5,215,384 A * 6/1993 Maier .................... F16C 17/03
384/117
6,457,950 B1 * 10/2002 Cooper .................... F04C 2/16
417/366
(Continued)

FOREIGN PATENT DOCUMENTS

WO 2014/095291 A1 6/2014

OTHER PUBLICATIONS

Extended European Search Report dated Apr. 22, 2020 in corresponding European Patent Application No. 19205456.7, filed Oct. 25, 2019.

*Primary Examiner* — Phillip A Johnson
(74) *Attorney, Agent, or Firm* — Global IP Counselors, LLP (57) ABSTRACT A multiphase pump for conveying a multiphase process fluid includes a pump housing, a rotor and a radial bearing. The rotor is arranged in the pump housing and is configured to rotate about an axial direction. The radial bearing has a support carrier and a support structure to support the rotor with respect to a radial direction. The rotor includes a pump shaft and an impeller fixedly mounted on the pump shaft to convey the process fluid from a pump inlet to a pump outlet. A squeeze film damper is provided to reduce vibrations of the rotor, the squeeze film damper arranged around the support structure of the radial bearing, and having an radially outer surface. A damping gap is arranged between the support structure of the radial bearing and the radially outer surface of the squeeze film damper. The damping gap is configured to receive a damping fluid.

14 Claims, 6 Drawing Sheets

(51) Int. Cl.
*F16F 15/023* (2006.01)
*F04D 29/66* (2006.01)
*F04D 13/08* (2006.01)
*F04D 29/047* (2006.01)
*H02K 5/132* (2006.01)
*H02K 5/167* (2006.01)

(52) U.S. Cl.
CPC ........ *F16F 15/0237* (2013.01); *F04D 29/047* (2013.01); *F16C 2360/00* (2013.01); *F16C 2360/44* (2013.01); *H02K 5/132* (2013.01); *H02K 5/1672* (2013.01)

(58) Field of Classification Search
CPC ........ F04D 17/06; F04D 17/12; F04D 17/122; F04D 19/02; F04D 29/047; F04D 29/0473; F04D 29/0476; F04D 29/057; F04D 29/668; H02K 5/132; H02K 5/1672
See application file for complete search history.

(56) References Cited

U.S. PATENT DOCUMENTS

| | | | |
|---|---|---|---|
| 6,566,774 | B2 | 5/2003 | Parmeter et al. |
| 7,066,651 | B2* | 6/2006 | Nicholas ................ F16C 27/02 384/99 |
| 9,273,699 | B2 | 3/2016 | Meuter et al. |
| 9,328,797 | B2 | 5/2016 | Zeidan |
| 2009/0098003 | A1* | 4/2009 | Kothnur ................ F01C 21/02 418/205 |
| 2010/0111681 | A1 | 5/2010 | Nakano et al. |
| 2011/0280741 | A1* | 11/2011 | Meuter ................ F04D 29/057 417/205 |
| 2012/0257985 | A1 | 10/2012 | Parmeter et al. |
| 2013/0136629 | A1* | 5/2013 | Maier ................... F04D 29/584 417/366 |
| 2013/0343932 | A1* | 12/2013 | Stinessen ............. F04D 29/056 417/410.1 |
| 2014/0300231 | A1 | 10/2014 | Delgado Marquez et al. |
| 2018/0119737 | A1* | 5/2018 | Kjellnes ................ F16C 17/03 |
| 2020/0325933 | A1* | 10/2020 | Prevost ................ F16C 33/043 |

* cited by examiner

MULTIPHASE PUMP

CROSS-REFERENCE TO RELATED APPLICATION

This application claims priority to European Patent Application No. 19205456.7, filed Oct. 25, 2019, the contents of which are hereby incorporated herein by reference in their entirety.

BACKGROUND

Field of the Invention

The invention relates to a multiphase pump for conveying a multiphase process fluid.

Background Information

Multiphase pumps are used in many different industries, where it is necessary to convey a multiphase process fluid which comprises a mixture of a plurality of phases, for example a liquid phase and a gaseous phase. An important example is in the oil and gas processing industry where multiphase pumps are used for conveying hydrocarbon fluids, for example for extracting the crude oil from the oil field or for transportation of the oil/gas through pipelines or within refineries.

Fossil fuels are usually not present in pure form in oil fields or gas fields, but as a multiphase mixture which contains liquid components, gas components and possibly also solid components. This multiphase mixture of e.g. crude oil, natural gas, chemicals, seawater and sand has to be pumped from the oil field or gas field. For such conveying of fossil fuels, multiphase pumps are used which are able to pump a liquid-gas mixture which can also contain solid components, sand for example.

One of the challenges regarding the design of multiphase pumps is the fact that in many applications the composition of the multiphase process fluid strongly varies during operation of the pump. For example, during exploitation of an oil field the ratio of the gaseous phase (e.g. natural gas) and the liquid phase (e.g. crude oil) strongly varies. These variations can occur very suddenly and can cause a drop in pump efficiency, vibrations of the pump or other problems. The ratio of the gaseous phase in the multiphase mixture is commonly measured by the dimensionless gas volume fraction (GVF) designating the volume ratio of the gas in the multiphase process fluid. In applications in the oil and gas industry the GVF can vary from 0% to 100%.

SUMMARY

In view of an efficient exploitation of oil and gas fields there is nowadays an increasing demand for pumps that can be installed directly on the sea ground in particular down to a depth of 500 m, down to 1000 m or even down to more than 2000 m beneath the water's surface. It has been found that the design of such pumps is challenging, in particular because these pumps shall operate in a difficult subsea environment for a long time period with as little as possible maintenance and service work. This requires specific measurements to minimize the amount of equipment involved and to optimize the reliability of the pump.

It has been found that multiphase pumps are prone to rotor vibrations. The rotor of the pump comprises the pump shaft and the impeller(s) fixed to the pump shaft in a torque proof manner. There are several reasons why rotor vibrations are an issue particularly in multiphase pumps. A usual single phase centrifugal pump has a significant amount of internal damping due to the leakage of the single phase process fluid through the internal seals or gaps along the rotor of the pump. Examples for such seals or gaps are the impeller eye seal, the impeller hub seal, wear rings, throttle bushings and the balance drum. The leakage flow of the process fluid through these seals or gaps counteracts vibrations and generates a rotor damping. The physical phenomenon, on which this damping is based, is the Lomakin effect. The Lomakin effect is a force created at small gaps e.g. at wear rings, throttling bushes or balancing devices in centrifugal pumps. The force is a result of an unequal pressure distribution around the circumference of the pump shaft during periods of rotor eccentricity or pump shaft deflection. This is due to the eccentricity of the rotor the clearance, i.e. the gap between the rotor and the stationary part surrounding the rotor, being larger at one side of the rotor than on the other side of the rotor. This results in differences in the local velocity of the fluid. The local velocity of the fluid is higher at those locations where the clearance is larger. A higher local velocity causes a lower pressure and a lower local velocity causes a higher pressure. This creates a net corrective force, which always acts in the direction opposite to the shaft deflection or eccentricity. Thus, the Lomakin effect supports the centering of the pump shaft and therewith generates a damping of the rotor.

A multiphase pump can be designed for conveying multiphase process fluids having a GVF from 0% to 100%, i.e. all process fluids from a pure liquid (GVF=0%) to a pure gas (GVF=100%). At high GVF values the pressure rise generated by the multiphase pump is significantly smaller than at low GVF values. A multiphase pump, which is for example configured with helico-axial impellers, typically has only the balance drum and the diffuser gaps as clearances. These clearances are designed to allow the leakage of a liquid and are thus considerably large for applications or operating conditions with high GVFs. Thus, the problem regarding multiphase pumps is that for operating conditions with high GVF values there is only a very small damping of the rotor generated by the Lomakin effect, because the multiphase pump has only a few gaps or clearances along the pump shaft and these gaps and clearances are quite large for a process fluid having a high gas content or being close to a pure gaseous process fluid. In addition, as already said, at high GVF values the pressure rise generated by the pump decreases considerably. Therefore, the pressure drop over the clearances and gaps is significantly reduced, so that the stabilizing force generated by the Lomakin effect decreases remarkably.

To address this problem in a multiphase pump it has been proposed in U.S. Pat. No. 9,273,699 to provide a hydrodynamic stabilization device for the rotor. The device is configured as a process fluid lubricated Lomakin damper, i.e. a damper that works on the basis of the Lomakin effect. The damper comprises a cover ring extending along the radially outer tips of the blades of a helico-axial impeller. The cover ring is fixed to the blades of the impeller. Thus, a gap is formed between the rotating cover ring and the stationary part of the pump housing surrounding the cover ring. According to one embodiment, high pressure process fluid from the discharge line of the multiphase pump is injected into the gap between the cover ring and the stationary part. This fluid generates a hydrodynamic stabilization layer which generates damping of the rotor based on the Lomakin effect. The force resulting from the Lomakin effect is directed such that it centers the pump shaft and therewith dampens the vibrations of the rotor.

This hydrodynamic stabilization device has proven to be very effective in practice, however there is still room for improvement regarding the rotor damping in a multiphase pump.

The device proposed in U.S. Pat. No. 9,273,699 necessitates that a part of the pressurized process fluid is recirculated to form the stabilization layer in the gap. The recirculation of pressurized process fluid reduces the hydraulic performance and therewith the overall efficiency of the pump. In particular at high GVF values the efficiency of the device is reduced in an analogous manner as it has been described hereinbefore.

It is therefore an object of the invention to propose a multiphase pump with an improved damping of the rotor, so that the rotor vibrations are considerably reduced in particular at high GVF values of the multiphase process fluid.

The subject matter of the invention satisfying this object is characterized by the features described herein.

Thus, according to an embodiment of the invention, a multiphase pump for conveying a multiphase process fluid comprises a pump housing with a pump inlet and a pump outlet, a rotor arranged in the pump housing and configured to rotate about an axial direction, and at least one radial bearing having a support carrier and a support structure for supporting the rotor with respect to a radial direction perpendicular to the axial direction, wherein the rotor comprises a pump shaft and at least one impeller fixedly mounted on the pump shaft for conveying the process fluid from the pump inlet to the pump outlet, wherein a squeeze film damper is provided to reduce vibrations of the rotor, wherein the squeeze film damper is arranged around the support structure of the radial bearing, wherein the squeeze film damper has an radially outer surface, wherein a damping gap is arranged at a location between the support structure of the radial bearing and the radially outer surface of the squeeze film damper, and wherein the damping gap is configured to receive a damping fluid.

Thus, according to this embodiment of the invention a squeeze film damper is arranged around the support structure of the radial bearing. Since the function of the squeeze film damper is not based on the Lomakin effect but on a different physical principle, namely the viscous forces generated by the squeezing of the damping fluid, the squeeze film damper reliably dampens the vibration of the rotor also at very high GVF values.

Preferably a plurality of radial bearings is provided, each of which comprises a support carrier and a support structure for supporting the rotor with respect to the radial direction, wherein for each radial bearing a squeeze film damper is provided, which is arranged around the support structure of the particular radial bearing, wherein for each radial bearing a damping gap is arranged between the support structure of the radial bearing and the radially outer surface of the squeeze film damper, and wherein each damping gap is configured to receive a damping fluid. In a preferred arrangement the multiphase pump is a "between bearing" pump, meaning that there is a radial bearing at the dive end of the pump shaft and another radial bearing at the non-drive end of the pump shaft, whereas all impellers of the rotor are arranged between these two radial bearings. In this configuration there is a separate squeeze film damper for each of the two radial bearings.

According to a preferred configuration the multiphase pump has a plurality of impellers. Thus, the multiphase pump is designed as a multistage pump. The multistage multiphase pump can be configured with an in-line arrangement of all impellers, i.e. all impellers are arranged in series with the suction side facing in the same direction for each impeller, or with a back-to-back arrangement, i.e. with a first group of impellers and a second group of impellers, wherein the suction side of the impellers of the first group face in the opposite direction as the suction side of the impellers of the second group.

Particularly preferred the multiphase pump is configured as a helico-axial pump with helico-axial impellers. This design has proven to be very effective for pumping multiphase process fluids.

In some embodiments each squeeze film damper is arranged around one support carrier. Thus, the entire radial bearing is surrounded and supported by the squeeze film damper.

In other embodiments each radial bearing comprises one squeeze film damper, which is integrated into the particular radial bearing. In these integrated embodiments the damping gap is arranged inside the support carrier. With respect to the radial direction the damping gap is located between an inner ring and an outer ring of the support carrier.

According to a particularly preferred embodiment each radial bearing is configured to receive a lubricant for lubricating the radial bearing, and wherein each damping gap is configured to receive the lubricant as the damping fluid. The lubricant for lubricating the radial bearing is for example an oil which is typically used for lubrication. Using the lubricant for the radial bearing as the damping fluid for the squeeze film damper has several advantages.

Since the damping gap is fed with the lubricant for the radial bearing there is no extra internal process fluid leakage generated. In particular, it is not required to recirculate a part of the pressurized process fluid. Therefore, the efficiency of the multiphase pump is increased considerably. The hydraulic performance of the multiphase pump is not affected by providing the lubricant to the damping gap.

Furthermore, the performance of the squeeze film damper is independent of the process fluid and more particularly of the GVF of the multiphase process fluid, since it uses the lubricant as damping fluid. Thus, the squeeze film damper reliably operates independently of the actual GVF value of the process fluid.

In addition, the damping is more efficient, because typical lubricants such as oil normally have a higher viscosity than the multiphase process fluid, especially when the process fluid has a high GVF value. The lubricant used as the damping fluid can be any kind of lubricant fluid which is used in a multiphase pump such as for example the typical lubrication oils or a water-glycol mixture or simply water.

Furthermore, the squeeze film damper requires significantly lower pressure differences and lower damping fluid volume flows as for example a damping device that is based on the Lomakin effect.

According to a preferred design each radial bearing is configured as a hydrodynamic bearing and preferably as a tilting pad bearing.

Particularly in view of subsea application it is preferred that the multiphase pump further comprises a drive unit arranged in the pump housing and configured for driving the rotor. The pump housing with the drive unit inside can then be configured as a pressure housing, which is able to withstand the large hydrostatic pressure at a subsea location, e.g. on the sea ground.

Preferably, the drive unit comprises a drive shaft for driving the pump shaft of the rotor, and an electric motor for rotating the drive shaft about the axial direction. In addition, a coupling is provided for coupling the drive shaft to the pump shaft.

In some embodiments the multiphase pump is configured as a vertical pump with the pump shaft extending in the direction of gravity. In other embodiments the multiphase pump is configured as a horizontal pump, meaning that during operation the pump shaft is extending horizontally, i.e. the axial direction is perpendicular to the direction of gravity.

Particularly regarding the embodiments as vertical pump it is preferred that the drive unit is arranged on top of the pump shaft.

In other embodiments the multiphase pump is configured as a horizontal pump with the pump shaft extending perpendicular to the direction of gravity. Such embodiments as horizontal pump can be used for example at topside locations on an offshore platform or on a floating production storage and offloading unit (FPSO) or ashore.

In view of a preferred application the multiphase pump is configured as a subsea pump.

Furthermore, it is preferred, that the multiphase is configured for installation on a sea ground.

In view of another preferred application the multiphase pump is configured as a helico-axial multistage horizontal pump with an external drive unit, i.e. the drive unit is not arranged within the pump housing.

In addition, it is particularly preferred, that the multiphase pump is configured for conveying multiphase process fluids having a gas volume fraction of 0% to 100%, i.e. the multiphase fluid is configured in such a manner that it can be operated at all GVF values from 0% (pure liquid) to 100% (pure gas).

Further advantageous measures and embodiments of the invention will become apparent from the dependent claims.

BRIEF DESCRIPTION OF THE DRAWINGS

The invention will be explained in more detail hereinafter with reference to the drawings.

DETAILED DESCRIPTION

Figure 1:
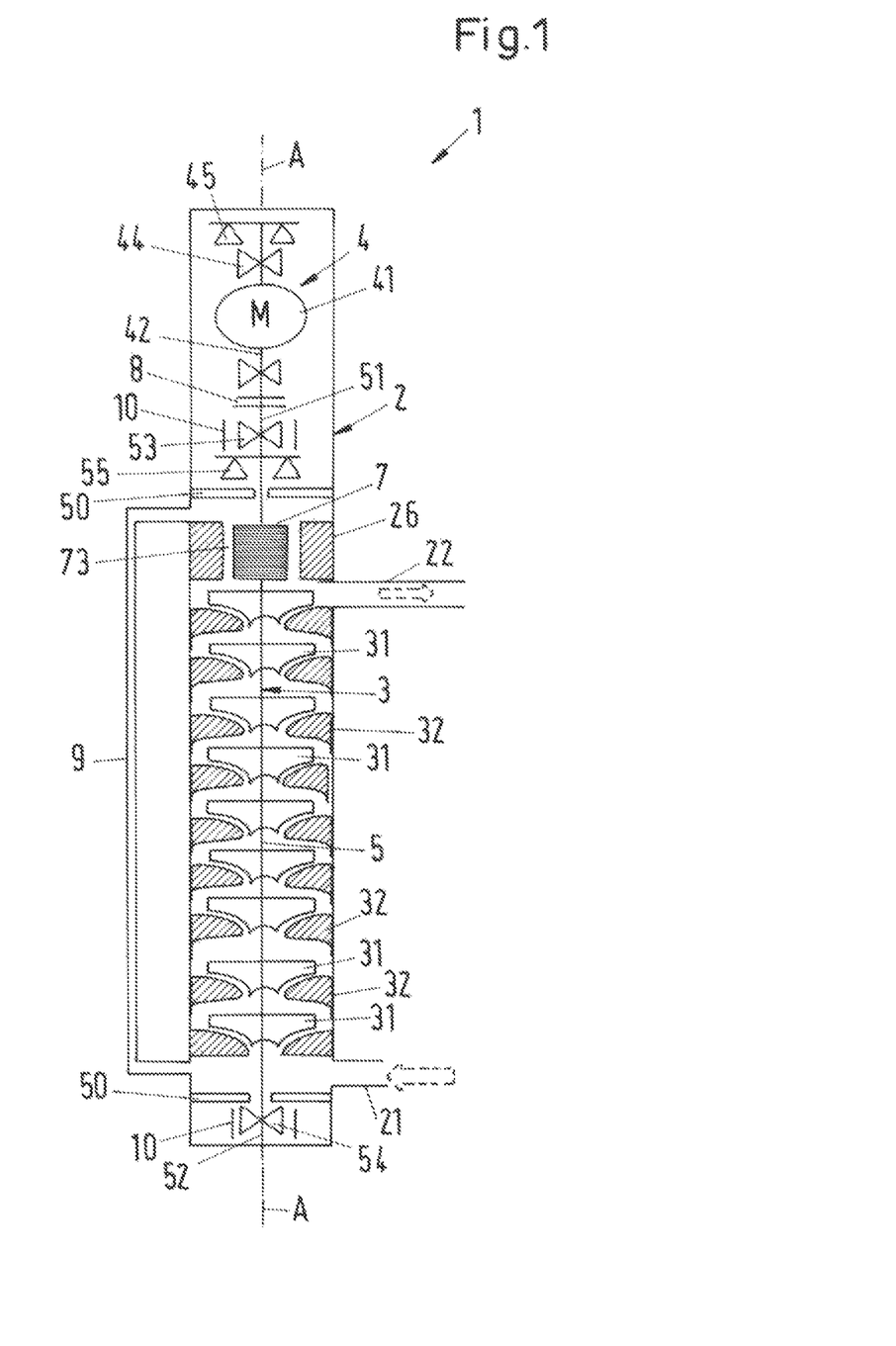
FIG. 1 is a schematic cross-sectional view of a first embodiment of a multiphase pump according to the invention.

FIG. 1 shows a schematic cross-sectional view of an embodiment of a multiphase pump according to an embodiment of the invention, which is designated in its entity with reference numeral 1. The pump 1 is designed as a centrifugal pump for conveying a multiphase process fluid. The pump 1 has a pump housing 2, in which a rotor 3 is arranged. The rotor 3 is configured to rotate about an axial direction A. A drive unit 4 is provided to rotate the rotor. In the embodiment shown in FIG. 1 the drive unit 4 is also arranged inside the pump housing 2. It goes without saying that in other embodiments of the multiphase pump the drive unit is arranged outside the pump housing 2, e.g. in a separate motor housing.

In the embodiment shown in FIG. 1 both the rotor 3 and the drive unit 4 are arranged within the pump housing 2. The pump housing 2 is designed as a pressure housing, which is configured to withstand the pressure generated by the multiphase pump 1 as well as the pressure exerted on the pump 1 by the environment. The pump housing 2 can comprise several housing parts, which are connected to each other to form the pump housing 2 surrounding the rotor 3 and the drive unit 4. It is also possible that a rotor housing and a separate motor housing are both inserted in the pump housing 2. In the embodiment shown in FIG. 1 the pump housing 2 is configured as a hermetically sealed pressure housing preventing any leakage to the external environment.

In the following description reference is made by way of example to the important application that the multiphase pump 1 is designed and adapted for being used as a subsea multiphase pump 1 in the oil and gas industry. In particular, the multiphase pump 1 is configured for installation on the sea ground, i.e. for use beneath the water-surface, in particular down to a depth of 500 m, down to 1000 m or even down to more than 2000 m beneath the water-surface of the sea. In such applications the multiphase process fluid is typically a mixture containing hydrocarbons that has to be pumped from an oilfield for example to a processing unit beneath or on the water-surface or ashore. The multiphase mixture constituting the multiphase process fluid to be conveyed can include a liquid phase, a gaseous phase and a solid phase, wherein the liquid phase can include crude oil, seawater and chemicals, the gas phase can include methane, natural gas or the like and the solid phase can include sand, sludge and smaller stones without the multiphase pump 1 being damaged on the pumping of the multiphase mixture.

It has to be understood that the invention is not restricted to this specific example but is related to multiphase pumps in general. The multiphase pump 1 can also be configured for top side applications, e.g. for an installation ashore or on an oil platform, in particular on an unmanned platform. In addition, the pump 1 according to the invention can also be used for applications outside the oil and gas industry.

The pump housing 2 of the multiphase pump 1 comprises a pump inlet 21, through which the multiphase process fluid enters the pump 1, and a pump outlet 22 for discharging the process fluid with an increased pressure as compared to the pressure of the process fluid at the pump inlet 21. Typically, the pump outlet 22 is connected to a pipe (not shown) for delivering the pressurized process fluid to another location. The pressure of the process fluid at the pump outlet 22 is referred to as 'high pressure' whereas the pressure of the process fluid at the pump inlet 21 is referred to as 'low pressure'. A typical value for the difference between the high pressure and the low pressure is for example 100 to 200 bar (10-20 MPa).

The rotor 3 of the multiphase pump 1 comprises a pump shaft 5 extending from a drive end 51 to a non-drive end 52 of the pump shaft 5. The pump shaft 5 is configured to rotate about the axial direction A, which is defined by the longitudinal axis of the pump shaft 5.

The rotor 3 further comprises at least one impeller 31 fixedly mounted on the pump shaft 5 in a torque proof manner. In the embodiment shown in FIG. 1 a plurality of impellers 31, namely nine impellers 31 are arranged in series on the pump shaft 5, i.e. the multiphase pump 1 is configured as a nine stage pump. Of course, the number of nine stages is only exemplary. In other embodiments the multiphase pump 1 can comprise more than nine stages, e.g. ten or twelve stages, or less than nine stages for example four or two stages or only a single stage with only one impeller 31.

The plurality of impellers 31 is arranged in series and configured for increasing the pressure of the fluid from the low pressure to the high pressure.

The drive unit 4 is configured to exert a torque on the drive end 51 of the pump shaft 5 for driving the rotation of the pump shaft 5 and the impellers 31 about the axial direction A.

The multiphase pump 1 is configured as a vertical pump 1, meaning that during operation the pump shaft 5 extends in the vertical direction, which is the direction of gravity. Thus, the axial direction A coincides with the vertical direction.

In other embodiments (see FIG. 7) the multistage pump 1 can be configured as a horizontal pump, meaning that during operation the pump shaft is extending horizontally, i.e. the axial direction A is perpendicular to the direction of gravity.

A direction perpendicular to the axial direction A is referred to as radial direction. The term 'axial' or 'axially' is used with the common meaning 'in axial direction' or 'with respect to the axial direction'. In an analogous manner the term 'radial' or 'radially' is used with the common meaning 'in radial direction' or 'with respect to the radial direction'. Hereinafter relative terms regarding the location like "above" or "below" or "upper" or "lower" or "top" or "bottom" refer to the usual operating position of the pump 1. FIG. 1 shows the multiphase pump 1 in the usual operating position.

Referring to this usual orientation during operation and as shown in FIG. 1 the drive unit 4 is located above the rotor 3. However, in other embodiments the rotor 3 can be located on top of the drive unit 4.

As can be seen in FIG. 1 the multiphase pump 1 is designed with an inline arrangement of all impellers 31. In an inline arrangement all impellers 31 are arranged such that the axial thrusts generated by the individual rotating impellers 31 are all directed in the same direction, namely downwards in the axial direction A in FIG. 1. The flow of the fluid from the pump inlet 21 (low pressure) towards the pump outlet 22 (high pressure) is always directed in the same direction, namely in the upward direction, and does not change as e.g. in a back-to-back arrangement (see FIG. 7). Between the impellers 31 of adjacent stages there is in each case a stationary diffusor 32 for directing the flow of process fluid discharged from a particular impeller 31 to the impeller 31 of the next stage. Thus, between two adjacent impellers 31—as viewed in the axial direction A—there is in each case arranged one diffusor 32, which is stationary with respect to the pump housing 2.

Figure 2:
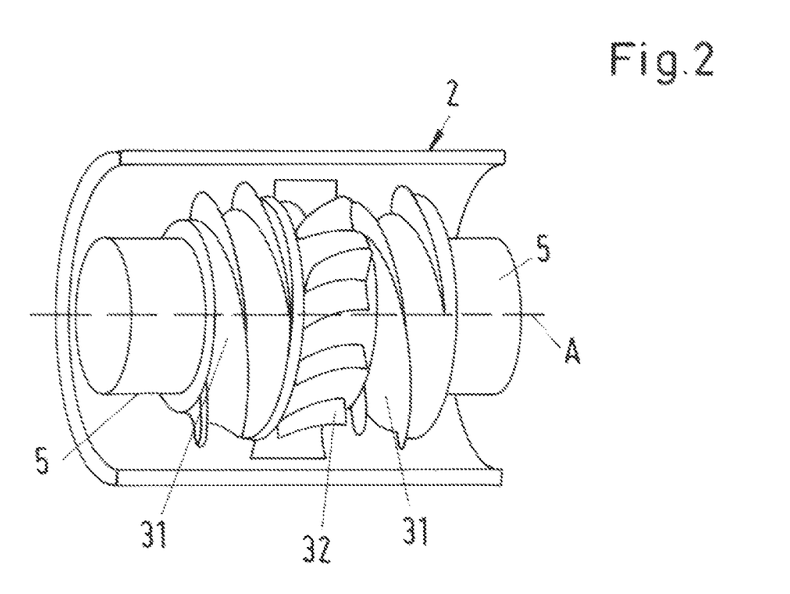
FIG. 2 is a perspective view of a helico-axial impeller.
Figure 3:
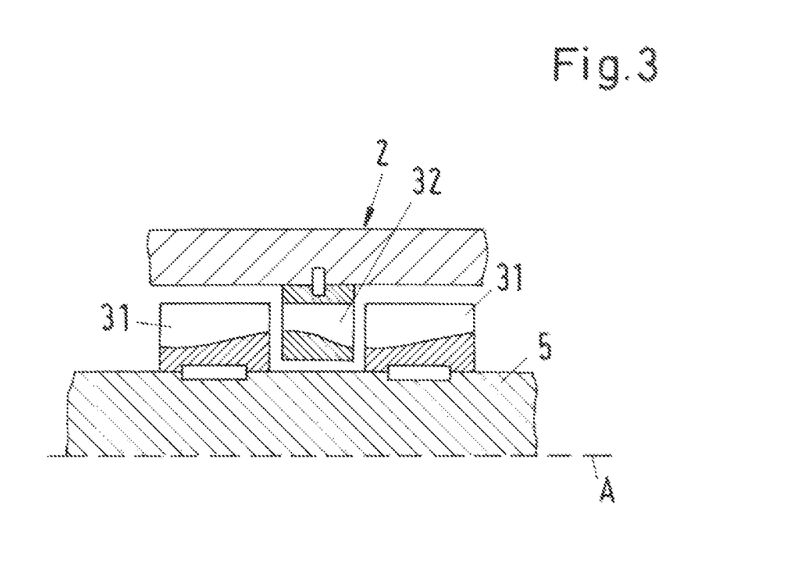
FIG. 3 is as FIG. 2 but in a cross-sectional view.

According to a preferred design the multiphase pump 1 is configured as a helico-axial pump with helico-axial impellers 31. Helico-axial impellers 31 and helico-axial multiphase pumps 1 as such are known in the art. FIG. 2 shows a perspective view of two helico-axial impellers 31 with the diffusor 32 interposed between these two impellers 31. In FIG. 2 half of the pump housing 2 has been removed to render visible the helico-axial impellers 31. A helico-axial impeller 31 has blades that extend helically around the hub of the impeller 31, or the pump shaft 5, respectively. In addition, FIG. 3 shows the two impellers 31 and the diffusor 32 between the two impellers 31 is a cross-sectional view with the cut line extending in axial direction A and through the pump shaft 5. As can be best seen in FIG. 3 the impellers 31 are fixed to the pump shaft 5 in a torque proof manner, e.g. by a key lock, and the diffusors 32 are fixed to the pump housing 2 or to a part that is stationary with respect to the pump housing 2.

In other embodiments the impellers 31 may not be configured as helico-axial impellers, but for example as semi-axial impellers.

For at least partially balancing the axial thrust generated by the impellers 31 during operation of the multiphase pump 1 it is preferred that the multiphase pump 1 comprises at least one balancing device. In the embodiment shown in FIG. 1 the balancing device comprises a balance drum 7 (also referred to as a throttle bush). The balance drum 7 is fixedly connected to the pump shaft 5 in a torque proof manner, i.e. the balance drum 7 is part of the rotor 3. The balance drum 7 is arranged behind—as seen in the flow direction of the process fluid—the impeller 31 of the last stage that delivers the process fluid to the pump outlet 22, namely between the impeller 31 of the last stage and the drive end 51 of the pump shaft 5. The balance drum 7 defines a front side and a back side of the balance drum 7. The front side is the side facing the impeller 31 of the last stage. The back side is the side facing the drive unit 4. The balance drum 7 is surrounded by a stationary part 26, so that a relief passage 73 is formed between the radially outer surface of the balance drum 7 and the stationary part 26. The stationary part 26 is configured to be stationary with respect to the pump housing 2. The relief passage 73 forms an annular gap between the outer surface of the balance drum 7 and the stationary part 26 and extends from the front side to the back side.

A balance line 9 is provided to recirculate the process fluid from the back side of the balance drum 7 to the low pressure side at the pump inlet 21. In particular, the balance line 9 connects the back side with the low pressure side of the multiphase pump 1, where the low pressure, i.e. the pressure at the pump inlet 21 prevails. Thus, a part of the pressurized fluid passes from the front side, where essentially the high pressure prevails, through the relief passage 73 to the back side, enters the balance line 9 and is recirculated to the low pressure side of the multiphase pump 1. The balance line 9 constitutes a flow connection between the back side of the balance drum 7 and the low pressure side at the pump inlet 21. The balance line 9 can be arranged—as shown in FIG. 1—outside the pump housing 2. In other embodiments the balance line 9 can be designed as internal line completely extending within the pump housing 2.

Due to the balance line 9 the pressure prevailing at the back side is essentially the same—apart from a minor pressure drop caused by the balance line 9—as the low pressure prevailing at the pump inlet 21.

The axial surface of the balance drum 7 facing the front side is exposed to a pressure which essentially equals the high pressure at the pump outlet 22. At the back side of the balance drum 7 it is essentially the low pressure that prevails during operation of the pump 1. Thus, the pressure drop over the balance drum 7 is essentially the difference between the high pressure and the low pressure.

The pressure drop over the balance drum 7 results in a force that is directed upwardly in the axial direction A and therewith counteracts the downwardly directed axial thrust generated by the impellers 31.

The multiphase pump 1 further comprises a plurality of bearings. A first radial bearing 53, a second radial bearing 54 and an axial bearing 55 are provided to support the pump shaft 5. The first radial bearing 53, which is the upper one in FIG. 1, is arranged adjacent to the drive end 51 of the pump shaft 5 between the balance drum 7 and the drive unit 4. The second radial bearing 54, which is the lower one in FIG. 1, is arranged between the impeller 31 of the first stage and the non-drive end 52 of the pump shaft 5 or at the non-drive end 52. The axial bearing 55 is arranged between the impeller 31 of the last stage and the first radial bearing 53. The bearings 53, 54, 55 are configured to support the pump shaft 5 both in axial and radial direction. The radial bearing 53 and 54 are supporting the pump shaft 5 with respect to the radial direction, and the axial bearing 55 is supporting the pump shaft 5 with respect to the axial direction A. The first radial bearing 53 and the axial bearing 55 are arranged such that the first radial bearing 53 is closer to the drive unit 4 and the axial bearing 55 is facing the balance drum 7. Of course, it is also possible, to exchange the position of the first radial bearing 53 and the axial bearing 55, i.e. to arrange the first radial bearing 53 between the axial pump bearing 55 and the balance drum, so that the axial bearing 55 is closer to the drive unit 4.

This configuration with a radial bearing 53 at the drive end 51 of the shaft 5 and a radial bearing 54 at the non-drive end 52 of the pump shaft is called a between bearing arrangement, because all impellers 31 are arranged between the two radial bearings 53, 54.

It has to be noted that in other embodiments the multiphase pump 1 can be configured with only one radial bearing, for example in an overhung configuration.

A radial bearing, such as the first or the second radial bearing 53 or 54 is also referred to as a "journal bearing" and an axial bearing, such as the axial bearing 55, is also referred to as an "thrust bearing". The first radial bearing 53 and the axial bearing 55 can be configured as separate bearings, but it is also possible that the first radial bearing 53 and the axial bearing 55 are configured as a single combined radial and axial bearing supporting the pump shaft 5 both in radial and in axial direction.

The second radial bearing 54 supports the pump shaft 5 in radial direction. In the embodiment shown in FIG. 1, there is no axial bearing disposed at the non-drive end 52 of the pump shaft 5. Of course, in other embodiments it is also possible that an axial bearing for the pump shaft 5 is disposed at the non-drive end 52. In embodiments, where an axial bearing is disposed at the non-drive end 52 of the pump shaft 5, a second axial bearing can be disposed at the drive end 51 or the drive end 51 can be configured without an axial bearing.

Preferably, at least the radial bearings 53 and 54 are configured as hydrodynamic bearings, and even more preferred as tilting pad bearings 53, 54. In addition, also the axial bearing 55 can be configured as a hydrodynamic bearing 55, and even more preferred as a tilting pad bearing 55. Of course, it is also possible that the first radial bearing 53 and the second radial bearing 54 are each configured as a fixed multilobe hydrodynamic bearing.

The drive unit 4 comprises an electric motor 41 and a drive shaft 42 extending in the axial direction A. For supporting the drive shaft 42 a first radial drive bearing 43, a second radial drive bearing 44 and an axial drive bearing 45 are provided, wherein the second radial drive bearing 44 and the axial drive bearing 45 are arranged above the electric motor 41 with respect to the axial direction A, and the first radial drive bearing 43 is arranged below the electric motor 41. The electric motor 41, which is arranged between the first and the second radial drive bearing 43, 44, is configured to rotate the drive shaft 42 about the axial direction A. The drive shaft 42 is connected to the drive end 51 of the pump shaft 5 by a coupling 8 to transfer torque to the pump shaft 5.

The electric motor 41 of the drive unit 4 can be configured as a cable wound motor. In a cable wound motor the individual wires of the motor stator, which form the coils for generating the electromagnetic field(s) for driving the motor rotor, are each insulated, so that the motor stator can be flooded for example with a barrier fluid. Alternatively, the electric motor 41 can be configured as a canned motor. When the electric drive 41 is configured as a canned motor, the annular gap between the motor rotor and the motor stator of the electric motor 41 is radially outwardly delimited by a can that seals the motor stator hermetically with respect to the motor rotor and the annular gap. Thus, any fluid flowing through the gap between the motor rotor and the motor stator cannot enter the motor stator. When the electric motor 41 is designed as a canned motor a dielectric cooling fluid can be circulated through the hermetically sealed motor stator for cooling the motor stator.

Preferably, the electric motor 41 is configured as a permanent magnet motor or as an induction motor. To supply the electric motor 41 with energy, a power penetrator (not shown) is provided at the pump housing 2 to receive a power cable that supplies the electric motor 41 with power.

The electric motor 41 can be designed to operate with a variable frequency drive (VFD), in which the speed of the motor 41, i.e. the frequency of the rotation, is adjustable by varying the frequency and/or the voltage supplied to the electric motor 41. However, it is also possible that the electric motor 41 is configured differently, for example as a single speed or single frequency drive.

The drive shaft 42 is connected to the drive end 51 of the pump shaft 5 by the coupling 8 for transferring a torque to the pump shaft 5. Preferably the coupling 8 is configured as a flexible coupling 8, which connects the drive shaft 42 to the pump shaft 5 in a torque proof manner but allows for a relative lateral (radial) and/or axial movement between the drive shaft 42 and the pump shaft 5. Thus, the flexible coupling 8 transfers the torque but no or nearly no lateral vibrations. Preferably, the flexible coupling 8 is configured as a mechanical coupling 8. In other embodiments the flexible coupling can be designed as a magnetic coupling, a hydrodynamic coupling or any other coupling that is suited to transfer a torque from the drive shaft 42 to the pump shaft 5.

As already said, in other embodiments the drive unit 4 can be disposed in a separate motor housing, which is for example arranged outside of the pump housing 2.

The multiphase pump 1 further comprises two sealing units 50 for sealing the pump shaft 5 against leakage of the process fluid along the pump shaft 5. By the sealing units 50 the process fluid is prevented from entering the drive unit 4 as well as the bearings 53, 54, 55. One of the sealing units 50 is arranged between the balance drum 7 and the axial bearing 55 and the other sealing unit 50 is arranged between the impeller 31 of the first stage and the second radial bearing 54. Preferably each sealing unit 50 comprises a mechanical seal. Mechanical seals are well-known in the art in many different embodiments and therefore require no detailed explanation. In principle, a mechanical seal is a seal for a rotating shaft and comprises a rotor fixed to the pump shaft 5 and rotating with the pump shaft 5, as well as a stationary stator fixed with respect to the pump housing 2. During operation the rotor and the stator slide along each other—usually with a liquid there between—to provide a sealing action to prevent the process fluid from escaping to the environment or entering the drive unit 4 of the pump 1.

According to embodiments of the invention the multiphase pump 1 comprises at least one squeeze film damper 10 for reducing or damping vibrations of the rotor 3. Preferably, the squeeze film damper 10 is arranged around the radial bearing 53 or 54 or the squeeze film damper 10 is integrated into the radial bearing 53 or 54. In the embodiment in which the multiphase pump 1 includes two radial bearings 53, 54 as it is shown in FIG. 1 it is preferred that for each radial bearing 53 and 54 an individual squeeze film damper 10 is provided. Therefore, it is preferred that the number of squeeze film dampers 10 disposed in the multiphase pump 1 equals the number of radial bearings 53, 54, which are provided to support the rotor 3 of the multiphase pump 1.

In the following description reference is made only to the first radial bearing 53, because it is sufficient for understanding. Of course, it is preferred that each of the first radial bearing 53 and the second radial bearing 54 includes a squeeze film damper 10. Thus, the following explanations referring to the first radial bearing 53 apply also in an analogous manner for the second radial bearing 54.

Figure 4:
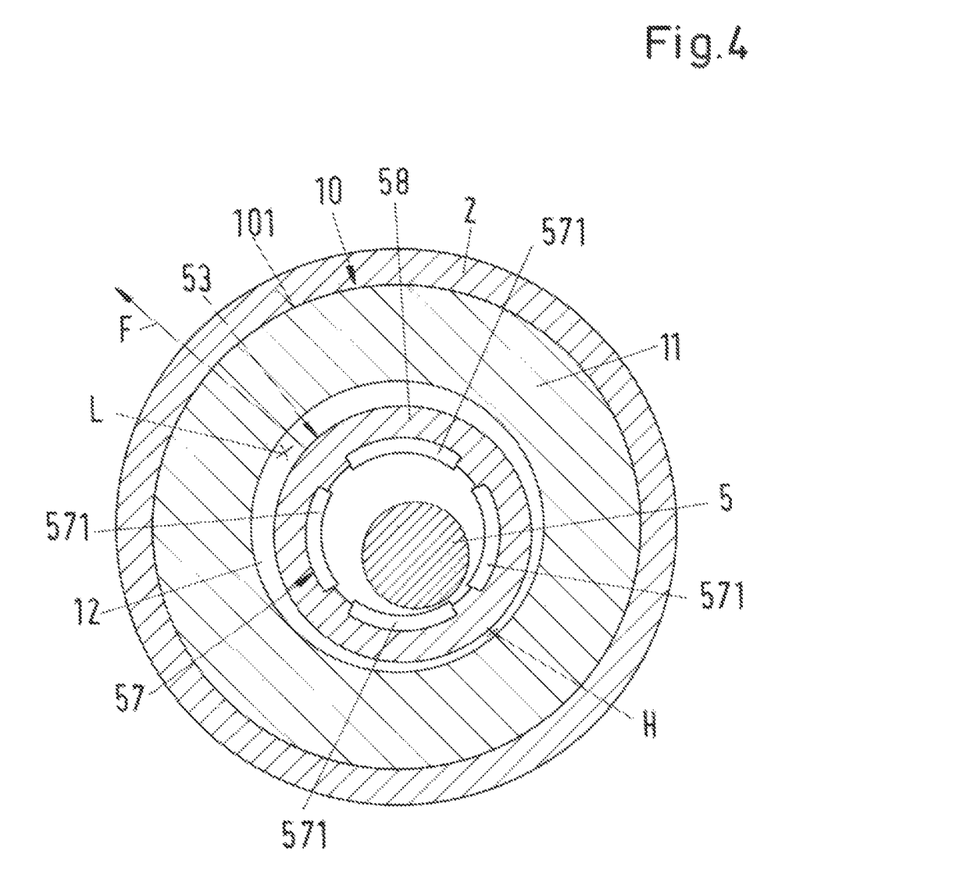
FIG. 4 is a schematic representation of a first embodiment of the radial bearing with the squeeze film damper in a cross-sectional view perpendicular to the pump shaft.
Figure 5:
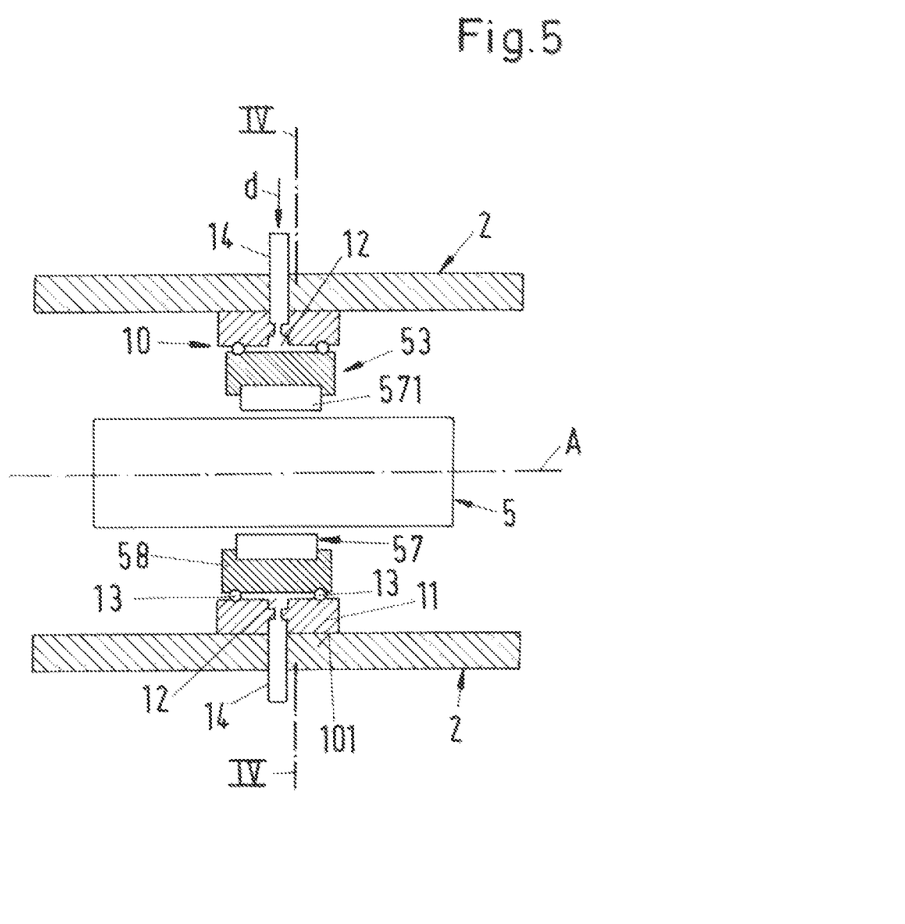
FIG. 5 is the embodiment of FIG. 4 in a cross-sectional view along the axial direction.

Referring now to FIG. 4 and FIG. 5 a first embodiment of the radial bearing 53 with the squeeze film damper 10 is explained in more detail. FIG. 4 shows a schematic representation of a first embodiment of the radial bearing 53 with the squeeze film damper in a cross-sectional view perpendicular to the pump shaft 5.

For a better understanding FIG. 5 shows the radial bearing 53 with the squeeze film damper 10 in a cross-sectional view along the axial direction A. In FIG. 5 the section line IV-IV for FIG. 4 is indicated.

The radial bearing 53 comprises a support structure 57 to support the pump shaft 5 as well as a support carrier 58, in which the support structure 57 is arranged. The support structure 57 comprises these elements, which are next to the pump shaft 5 for supporting the pump shaft 5. In this embodiment the radial bearing 53 is configured as a hydrodynamic bearing and more precisely as a radial tilting pad bearing. In the embodiment including a tilting pad bearing, the support carrier 58 is also called a pad carrier. Such tilting pad bearings are known in the art and therefore do not need a detailed description. The support structure 57 comprises a plurality—here four—pads 571, which are arranged around the circumference of the pump shaft 5. Each pad 571 is mounted to the support carrier 58 in a manner which allows tilting movement of each pad 571. Furthermore, the radial bearing 53 is configured to receive a lubricant (not shown) for generating a lubrication film between the support structure 57 and the rotating pump shaft 5 as it is known from hydrodynamic radial bearings. In many embodiments the lubricant is an oil. In other applications the lubricant can be another liquid, for example water or a mixture of water and glycol.

The squeeze film damper 10 comprises a casing 11, which is essentially ring-shaped and fixed with respect to the pump housing 2. In many embodiments the radial bearing 53 comprises a bearing housing which is fixedly mounted to the pump housing 2. In such embodiments the casing 11 is fixed to the bearing housing. Since it is not important for the understanding of the present invention, also a separate bearing housing, which is fixedly connected to the pump housing 2, is considered to be a part of the pump housing 2. The casing 11 of the squeeze film damper 10 is configured and arranged to surround the support carrier 58 with the support structure 57 within the support carrier 58. As can be best seen in FIG. 5 the radial bearing 53, more precisely the support carrier 58 is arranged completely within the casing 11 of the squeeze film damper 10—at least with respect to the radial direction. The squeeze film damper 10 has a radially outer surface 101, which is the lateral surface of the casing 11 abutting against the pump housing 2 (or any other element which is stationary with respect to the pump housing 2).

Preferably, a securing element (not shown) is provided, which is configured to secure the support carrier 58 against a rotation about the axial direction A.

A damping gap 12 is arranged at a location between the radially outer surface 101 of the squeeze film damper 10 and the support structure 57 of the radial bearing 53. In the first embodiment shown in FIG. 4 and FIG. 5 the damping gap 12 is arranged with respect to the radial direction between the support carrier 58 and the casing 11 of the squeeze film damper 10. The damping gap 12 is configured as an annular gap, which is delimited at the radially inner side by the radially outer surface of the support carrier 58 and at the radially outer side by the radially inner surface of the casing 11. With respect to the axial direction A the damping gap 12 is delimited by two annular and flexible sealing elements 13, each of which is clamped between the support carrier 58 and the casing 11. The sealing elements 13 are spaced apart from each other with respect to the axial direction A. Each sealing element 13 is arranged close to one of the two axial ends of the support carrier 58. Preferably the flexible sealing elements 13 are O-rings.

The squeeze film damper 10 further comprises at least one inlet 14, which is configured to supply a damping fluid to the damping gap 12 as it is indicated by the arrows with reference numeral d in FIG. 5. Thus, through the inlet 14 the damping gap 12 receives the damping fluid. The supply of damping fluid can include a check valve or any other suited means or device, so that the damping fluid can enter the damping gap through the inlet 14 but cannot leave the damping gap through the inlet 14.

Preferably, the damping fluid is a liquid, in particular an oil. Even more preferred, the lubricant for the radial bearing 53 is also used as the damping fluid. Thus, the lubricant is also supplied to the damping gap 12.

It has to be noted that FIG. 4 and FIG. 5 are schematic representations. In most embodiments the inlet 14 for supplying the damping gap 12 with the damping fluid does not pass through the pump housing 2 as an additional opening in the pump housing 2.

Referring in particular to FIG. 4 it will be explained, how the squeeze film damper works during operation of the multiphase pump 1. During operation, the damping gap 12 is completely filed with the damping fluid. FIG. 4 shows the pump shaft 5 in a deflected or eccentric position, i.e. the pump shaft 5 is not centered with respect to the support structure 57 of the radial bearing 53. In addition, the support carrier 58 of the radial bearing 53 is in an eccentric position with respect to the casing 11 of the squeeze film damper 10, meaning that the radial bearing 53 is not centered with respect to the casing 11. When the radial bearing 53 moves from a centered position to the eccentric position shown in FIG. 4, the width of the damping gap 12 in the radial direction gets smaller at a location H and larger at a location L. The damping fluid at location H, gets squeezed by the movement of the radial bearing 53 and is pushed towards location L. This movement of the damping fluid within the damping gap 12 generates viscous drag losses and thus generates the required energy dissipation and thus damping. During the movement from the bearing 53, the squeezing of the damping fluid at location H generates a higher local pressure of the damping fluid at the location H than at the location L. This results in a force F counteracting the movement of the radial bearing 53 and thus generates the damping of the movement generated by the vibration of the radial bearing 53, which is caused by the vibration of the shaft.

The squeeze film damper 10 functions as an additional spring-damper system, which is interposed between the radial bearing 53 and the pump housing 2. With this additional spring-damper system realized by the squeeze film damper 10 the overall damping as well as the overall stiffness can be designed in such a way to minimize or to reduce the vibrations of the rotor 3 in the multiphase pump 1. The rotordynamic coefficients of the squeeze film damper 10 can be tuned, in particular the stiffness and the damping coefficient in order to improve the overall damping of the multiphase pump.

Figure 6:
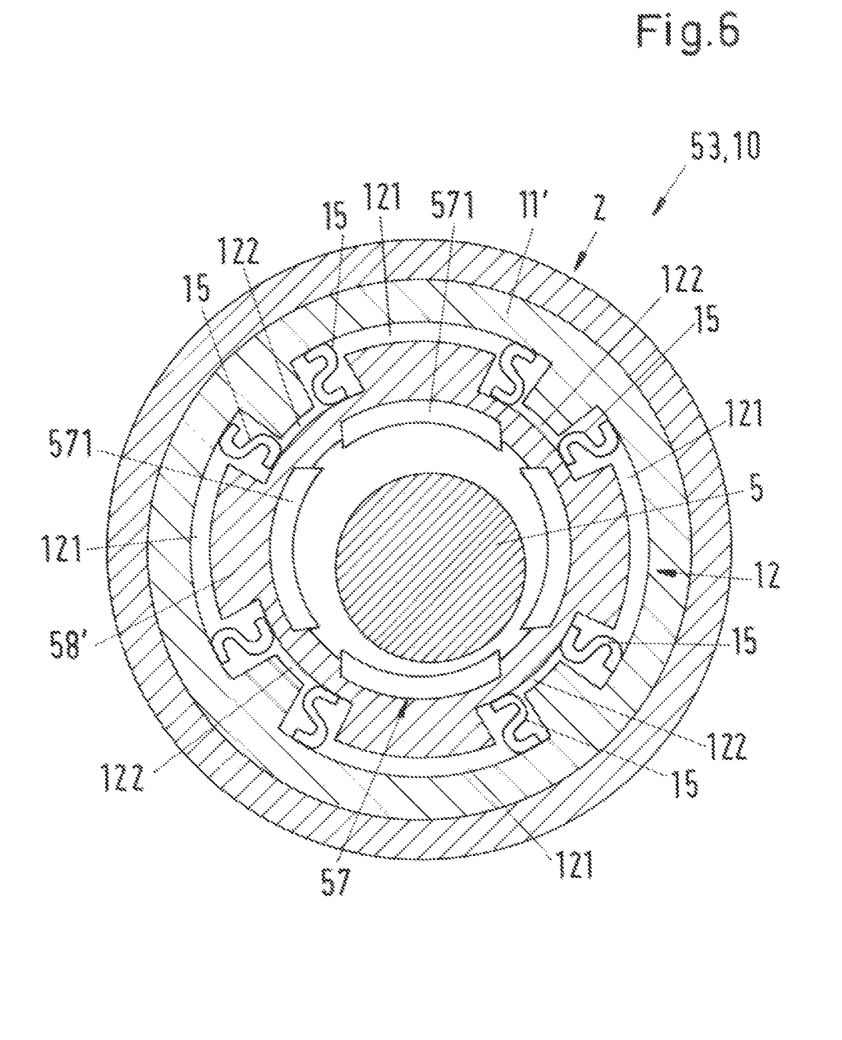
FIG. 6 is a schematic representation of a second embodiment of the radial bearing with the squeeze film damper in a cross-sectional view perpendicular to the pump shaft.

FIG. 6 shows a schematic representation of a second embodiment of the radial bearing 53 with the squeeze film damper 10 in a cross-sectional view perpendicular to the pump shaft 5, i.e. in an analogous representation as FIG. 4.

In the following description of the second embodiment of the radial bearing with the squeeze film damper the only differences from the first embodiment are explained in more detail. The explanations with respect to the first embodiment are also valid in the same way or in analogously the same way for the second embodiment. Same reference numerals designate the same features that have been explained with reference to the first embodiment or functionally equivalent features.

Compared to the first embodiment, it is the main difference, that in the second embodiment the squeeze film damper 10 is integrated into the radial bearing 53 and that springs 15 are provided.

Such squeeze film dampers 10 that are integrated into radial bearings 53 are commercially available on the market, for example from the company Waukesha Bearings, which offers this technology under the registered trademark ISFD. These dampers are disclosed and explained for example in U.S. Pat. No. 9,328,797. The use of the ISFD technology is widely spread in the field of normal compressors for compressing gases, but up to know it has never been disclosed nor suggested to use the ISFD technology in combination with pumps or multiphase pumps 1.

The radial bearing 53 with integrated squeeze film damper 10 comprises an outer ring 11', which is comparable to the casing 11 of the first embodiment, and an inner ring 58', which is comparable to the support carrier 58 of the first embodiment. The outer ring 11' and the inner ring 58' are coaxially arranged. The support structure 57 comprises the four pads 571, which are arranged around the circumference of the pump shaft 5. Each pad 571 is mounted to the inner ring 58' in a manner which allows a tilting movement of each pad 571. Furthermore, the inner ring 58' is configured to receive a lubricant (not shown) for generating a lubrication film between the support structure 57 and the pump shaft 5.

In addition, a plurality of integrated springs 15 is provided which is configured to provide a spring action between the inner ring 58' and the outer ring 11'. In the second embodiment in FIG. 6 four pairs of springs 15 are provided, wherein the four pairs are equidistantly distributed with respect to the circumferential direction between the inner ring 58' and the outer ring 11'. Each spring 15 is designed essentially with a S-shape, wherein the one end of the S is connected to the outer ring 11' and the other end of the S is connected to the inner ring 58'. Each spring 15 is an integrated part both of the inner ring 58' and of the outer ring 11'.

The damping gap 12 is arranged between the outer ring 11' and the inner ring 58'. Regarding the circumferential direction the damping gap 12 is divided in four outer sections 121 each of which extends from one of the pairs of springs 15 to the adjacent pair of springs 15 when viewed in the circumferential direction. Each outer section 121 extends from the radially outer end of the particular S-shaped spring 15 to the radially outer end of the particular S-shaped spring 15 of the adjacent pair of springs 15.

The damping gap 12 further comprises four inner sections 122, each of which extends from the radially inner end of a particular S-shaped spring 15 to the radially inner end of the S-shaped spring 15 belonging to the same pair of springs.

Each of the outer sections 121 and each of the inner sections 122 of the damping gap 12 is configured to receive the damping fluid (not shown). The damping fluid is the same fluid as the lubricant for the radial bearing 53.

The second embodiment, too, constitutes an additional spring-damper system which can be used to optimize the damping as well as the stiffness coefficient of the damper 10 in order to minimize or to reduce the vibrations of the rotor 3 in the multiphase pump 1. In the second embodiment the springs 15 constitute an additional parameter for adjusting the stiffness and the dampening of the radial bearing 53.

Dividing the damping gap 12 into the four outer sections 121 which are not in direct fluid communication with each other as well as into four inner sections 122, which are not in direct fluid communication with each other has the advantage that a rotation of the damping fluid about the pump shaft 5 is prevented.

Using the same fluid, which is different from the process fluid, both as lubricant for the radial bearing 53 and as damping fluid for the squeeze film damper 10 has several advantages.

The hydraulic performance of the multiphase pump 1 is not affected, because it is not required to recirculate any pressurized process fluid as lubricant or as damping fluid.

The performance of the squeeze film damper 10 is independent from the actual GVF of the process fluid. Even strong or rapid changes in the GVF of the process fluid do not influence the function of the squeeze film damper.

The squeeze film damper 10 requires significantly lower pressure differences as compared to a damping based on the Lomakin effect, because the squeeze film damper generates the damping by viscous forces generated by the squeezing of the film of damping fluid, e.g. oil.

Although it is preferred to use a damping fluid and/or a lubricant which are different from the process fluid, it is also possible to use the process fluid as lubricant for the bearings 53, 54, 55 and/or as damping fluid for the squeeze film damper 10, e.g. when the multiphase pump 1 is designed as a process fluid lubricated multiphase pump 1 or as a seal-less multiphase pump 1. A seal-less pump has no mechanical seals. In many cases this requires that the pump and the drive unit for driving the pump are flooded with the process fluid. The advantage of the seal-less pump concept is the simpler design of the pump, which is an important aspect with respect to a subsea pump. In a seal-less pump the process fluid itself can be used for cooling and lubricating components of the pump, e.g. the bearings 53,54,55 of the pump shaft 5 and the drive unit of the pump.

When the multiphase process fluid is used as lubricant and/or as damping fluid, it is advantageous to generate from the multiphase process fluid one or more phase-enriched component(s). A phase-enriched component is a component that contains the respective phase with a higher percentage or with a higher concentration than the multiphase process fluid entering the pump 1 through the pump inlet 21. For example, by removing at least partially the solid phase from the multiphase process fluid a liquid- and gas-enriched component can be generated.

In order to generate the at least one phase-enriched component from the multiphase process fluid the multiphase pump 1 can comprise at least one separating system arranged at the lower end of the pump 1 (according to the representation in FIG. 1). During the operation of the multiphase pump 1, some of the pumped multiphase process fluid is removed from the high-pressure side and supplied to the separation system. The separation system separates the multiphase process fluid into three components, a gas-enriched component, a liquid-enriched component and a solid component which substantially includes the solid portion from the removed portion of the multiphase process fluid. After the separation the liquid-enriched component can be used as lubricant and/or as damping fluid. Regarding the design and the operating mode of such a separation system reference is made by way of example to WO 2014/095291 A1 where a detailed explanation of a separation system can be found.

Figure 7:
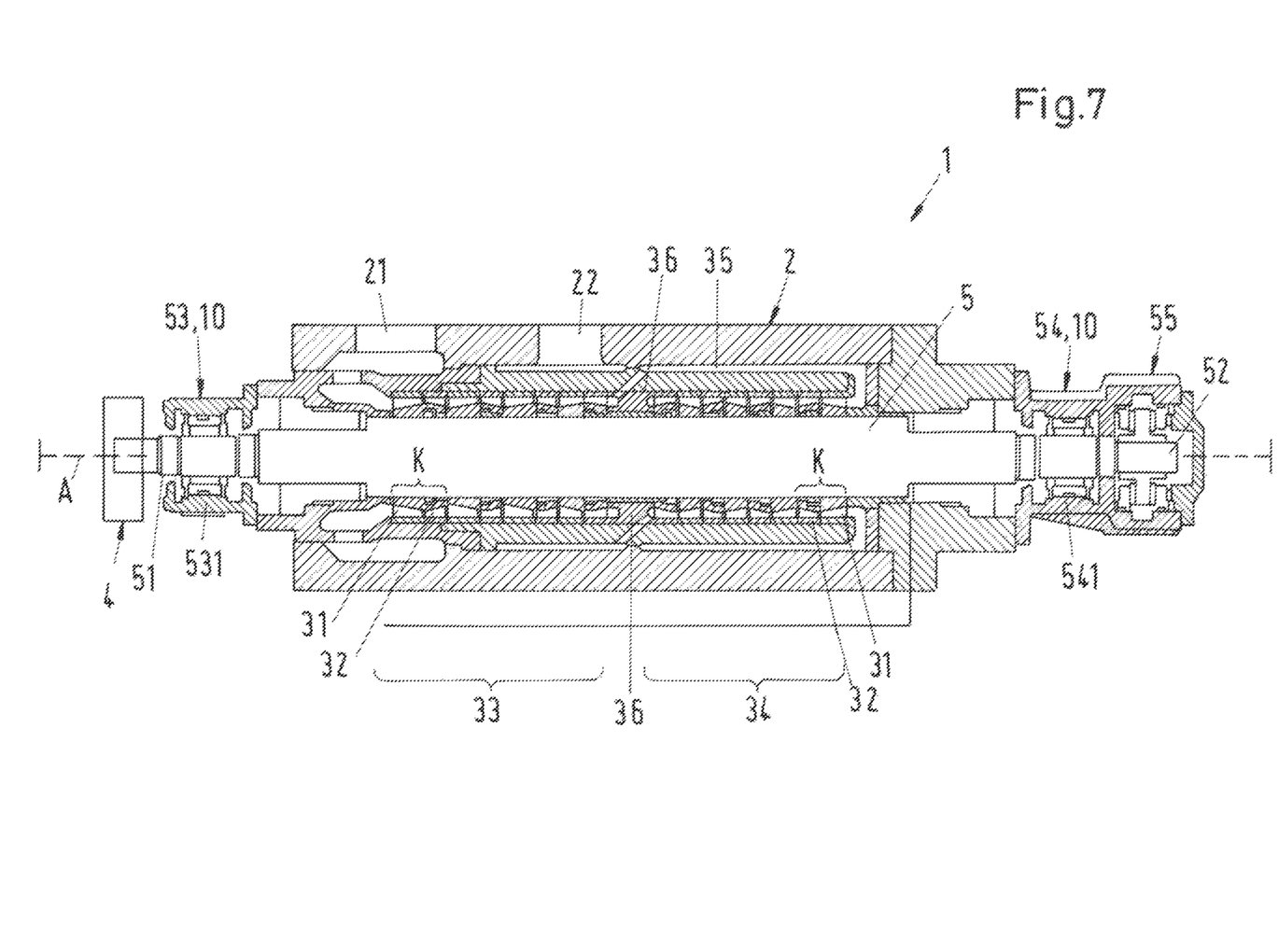
FIG. 7 is a cross-sectional view of a second embodiment of a multiphase pump according to the invention.

FIG. 7 shows a cross-sectional view of a second embodiment of a multiphase pump 1 according to the invention. In the following description of the second embodiment of the multiphase 1 only the differences to the first embodiment of the multiphase pump 1 are explained in more detail. The explanations with respect to the first embodiment of the multiphase pump 1 are also valid in the same way or in analogously the same way for the second embodiment of the multiphase pump 1. Same reference numerals designate the same features that have been explained with reference to the first embodiment or functionally equivalent features.

It has to be noted that the second embodiment of the multiphase pump 1 can comprise the first embodiment (FIG. 4, FIG. 5) or the second embodiment (FIG. 6) of the radial bearing 53, 54 with the squeeze film damper 10, i.e. both embodiments of the radial bearing 53, 54 with the squeeze film damper 10 can be used for the second embodiment of the multiphase pump 1.

The second embodiment of the multiphase pump 1 is configured as a helico-axial multistage pump 1 with a plurality of helico-axial impellers 31 (see also FIG. 2 and FIG. 3) and as a horizontal pump 1, meaning that during operation the pump shaft 5 is extending horizontally, i.e. the axial direction A is perpendicular to the direction of gravity. In the second embodiment of the multiphase pump 1 the drive unit 4 is not arranged within the pump housing 2 but in a separate motor housing which is not shown in detail.

The first radial bearing 53 at the drive end 51 of the pump shaft 5 is arranged in a first bearing housing 531, which is fixedly mounted to the pump housing 2 and therefore can also be considered as a part of the pump housing 2. The second radial bearing 54 at the non-drive end 52 of the pump shaft 5 is arranged in a second bearing housing 541, which is fixedly mounted to the pump housing 2 and therefore can also be considered as a part of the pump housing 2. The axial bearing 55 is arranged at the non-drive end 52 of the pump shaft 2 and can be arranged within the second bearing housing 541.

The multistage stage, multiphase pump 1 shown in FIG. 7 is configured with eight stages wherein each stage comprises one impeller 31 and one diffusor 32 as it is indicated by the reference numeral K in FIG. 7.

As can be seen in FIG. 7 the plurality of impellers 31 comprises a first set of impellers 33 and a second set of impellers 34, wherein the first set of impellers 33 and the second set of impellers 34 are arranged in a back-to-back arrangement. The first set of impellers 33 comprises the impeller 31 of the first stage, which is the stage next to the pump inlet 2, and the impellers 31 of the stages two, three and four. The second set of impellers 34 comprises the impeller 31 of the last stage, which is the stage next to the pump outlet 22, and the impellers 31 of the stages five, six and seven.

In other embodiments the first set of impellers can comprise a different number of impellers than the second set of impellers. The number of eight stages is of course exemplary. In other embodiments there can be more or less than eight stages.

In a back-to-back arrangement the first set of impellers 33 and the second set of impellers 34 are arranged such that the axial thrust generated by the action of the rotating first set of impellers 33 is directed in the opposite direction as the axial thrust generated by the action of the rotating second set of impellers 34. The multiphase process fluid enters the multistage pump 1 through the pump inlet 21 located at the left side according to the representation in FIG. 7, passes the stages one (first stage), two, three and four, is then guided through a crossover line 35 to the suction side of the fifth stage impeller, which is the rightmost impeller 31 in FIG. 7 passes the stages five, six, seven and eight (last stage), and is then discharged through the pump outlet 22. Thus, the flow of the multiphase process fluid through the first set of impellers 33 is directed essentially in the opposite direction than the flow through the second set of impellers 34.

For many applications the back-to-back arrangement is preferred because the axial thrust acting on the pump shaft 5, which is generated by the first set of impellers 33 counteracts the axial thrust, which is generated by the second set of impellers 34. Thus, said two axial thrusts compensate each other at least partially.

As a further balancing device for reducing the overall axial thrust acting on the pump shaft 5, a center bush 36 is arranged between the first set of impellers 33 and the second set of impellers 34. The center bush 35 is fixedly connected to the pump shaft 5 in a torque proof manner and rotates with the pump shaft 5. The center bush 35 is arranged on the pump shaft 5 between the last stage impeller 31, which is the last impeller of the second set of impellers 34, and the impeller 31 of the fourth stage, which is the last impeller 31 of the first set of impellers 33, when viewed in the direction of increasing pressure, respectively. The center bush 35 is surrounded by a stationary part being stationary with respect to the pump housing 2. An annular balancing passage is formed between the outer surface of the center bush 35 and the stationary part.

The function of the center bush 35 between the first and the second set of impellers 33, 34 is a balancing of the axial thrust and a damping of the pump shaft 5 based on the Lomakin effect. At the axial surface of the center bush 35 facing the impeller 31 of the last stage the high pressure prevails, and at the other axial surface facing the impeller 31 of the fourth stage a lower pressure prevails, which is an intermediate pressure between the high pressure and the low pressure. Therefore, the process fluid can pass from the impeller 31 of the last stage through the balancing passage along the center bush 36 to the impeller 31 of the fourth stage.

The pressure drop over the center bush 36 essentially equals the difference between the high pressure and the intermediate pressure. The pressure drop over the center bush 36 results in a force that is directed to the left according to the representation in FIG. 7 and therewith counteracts the axial thrust generated by the second set of impellers 34, which is directed to the right according to the representation in FIG. 7.

As a further balancing device for reducing the overall axial thrust acting on the pump shaft 5 the multiphase pump 1 can also comprise the balance drum 7 with the balance line 9 in an analogous manner as it has been described with respect to the first embodiment of the multistage pump 1. The first radial bearing 53 is configured with the squeeze film damper 10 and the second radial bearing 54 is also configured with a squeeze film damper 10. Each squeeze film damper 10 can be arranged around the support carrier 58 of the radial bearing 53 or 54, respectively, or each radial bearing 53, 54 comprises one squeeze film damper 10, which is integrated into the particular radial bearing 53, 54.

What is claimed:

1. A multiphase pump for conveying a multiphase process fluid, comprising:
   a pump housing with a pump inlet and a pump outlet;
   a rotor arranged in the pump housing and configured to rotate about an axial direction; and
   a radial bearing having a support carrier and a support structure configured to support the rotor with respect to a radial direction perpendicular to the axial direction, the rotor comprising a pump shaft and at least one impeller fixedly mounted on the pump shaft to convey the process fluid from the pump inlet to the pump outlet, a squeeze film damper is provided to reduce vibrations of the rotor, the squeeze film damper arranged around the support structure of the radial bearing, the squeeze film damper having a radially outer surface, a damping gap arranged between the support structure of the radial bearing and the radially outer surface of the squeeze film damper, and the damping gap configured to receive a damping fluid,
   the pump being a helico-axial pump with a helico-axial impeller, and the radial bearing being a tilting pad bearing, the support carrier being a pad carrier of the tilting pad bearing, and the support structure comprising a plurality of pads with each of the plurality of pads being mounted to the pad carrier in a manner so as to enable tilting movement of each pad of the plurality of pads.

2. The multiphase pump in accordance with claim 1, wherein the radial bearing is a first radial baring of a plurality of radial bearings, the plurality of radial bearings comprising at least a second radial bearing, the second radial bearing comprising a support carrier and a support structure to support the rotor with respect to the radial direction, for of the second radial bearing a squeeze film damper is provided arranged around the support structure of the second radial bearing and a damping gap configured to receive a damping fluid is arranged between the support structure of the second radial bearing and a radially outer surface of the squeeze film damper for the second radial bearing, the second radial bearing being a tilting pad bearing, the support carrier for the second radial bearing being a pad carrier of the second radial bearing, and the support structure of the second radial bearing comprising a plurality of pads with each of the plurality of pads being mounted to the pad carrier of the second radial bearing so as to enable tilting movement of each pad of the plurality of pads of the second radial bearing.

3. The multiphase pump in accordance with claim 2, wherein the squeeze film damper for each of the first and second radial bearings is arranged around a respective support carrier.

4. The multiphase pump in accordance with claim 1, wherein the at least one impeller includes a plurality of impellers.

5. The multiphase pump in accordance with claim 1, wherein the squeeze film damper for the radial bearing is the only squeeze film damper and is integrated into the radial bearing.

6. The multiphase pump in accordance with claim 1, wherein the radial bearing is configured to receive a lubricant to lubricate the radial bearing, and the damping gap is configured to receive the lubricant as the damping fluid.

7. The multiphase pump in accordance with claim 1, further comprising a drive unit arranged in the pump housing and configured to drive the rotor.

8. The multiphase pump in accordance with claim 7, wherein the drive unit comprises a drive shaft to drive the pump shaft of the rotor, and an electric motor to rotate the drive shaft about the axial direction, and a coupling is provided to couple the drive shaft to the pump shaft.

9. The multiphase pump in accordance with claim 7, wherein the drive unit is arranged on top of the pump shaft.

10. The multiphase pump in accordance with claim 1, wherein the pump is a vertical pump with the pump shaft extending in a direction of gravity.

11. The multiphase pump in accordance with claim 1, wherein the pump is a horizontal pump with the pump shaft extending perpendicular to the direction of gravity.

12. The multiphase pump in accordance with claim 1, wherein the pump is configured to convey multiphase process fluids having a gas volume fraction of 0% to 100%.

13. The multiphase pump in accordance with claim 1 wherein the pump is a subsea pump.

14. The multiphase pump in accordance with claim 13, wherein the pump is configured to be installed in a sea ground.

* * * * *